July 12, 1960    P. T. ANGELL ET AL    2,944,786
SUPER AND SUBSONIC VANELESS NOZZLE
Filed Oct. 15, 1953    2 Sheets-Sheet 1

Inventors
PIERCE T. ANGELL
ROBERT J. ANDERSON
MALCOLM M. HOPPER
By Hill, Sherman, Meroni, Gross & Simpson
Attys.

Inventors
PIERCE T. ANGELL
ROBERT J. ANDERSON
MALCOLM M. HOPPER

United States Patent Office 2,944,786
Patented July 12, 1960

2,944,786
SUPER AND SUBSONIC VANELESS NOZZLE

Pierce T. Angell, Euclid, Robert J. Anderson, Wickliffe, and Malcolm M. Hopper, Willoughby, Ohio, assignors to Thompson Ramo Wooldridge Inc., a corporation of Ohio Filed Oct. 15, 1953, Ser. No. 386,358

2 Claims. (Cl. 253—55)

The present invention relates to the construction of a turbine for operation at peripheral velocities above the speed of sound. More specifically it relates to turbines having an inlet fluid velocity less than the speed of sound and a turbine wheel having a peripheral velocity greater than the speed of sound, the difference in velocity being accomplished in a novel vaneless nozzle.

The operation of equipment at or above the speed of sound has posed many extremely difficult problems. One of the most important of these results from the difficulty of passing a compressible fluid through the sound barrier, or in other words through the speed of sound, without causing shock waves and other similar undesirable flow patterns. In the usual installations of which we are aware, vanes and similar flow directing apparatus have been used. When a gaseous fluid is forced through the speed of sound in the presence of such vanes or blades, various flow separation and shock patterns are set up which greatly hinder efficient operation.

The problem has become aggravated in recent years due to the fact that many of the modern day turbine installations relate to aircraft construction. For example in many instances it is desirable to utilize air from the slip stream of a traveling airplane to operate accessory units, such as for example generators and other similar rotating equipment. Since the speeds of modern aircraft now generally approach the speed of sound, air in the slip stream is found to be traveling at or only slightly below the speed of sound relative to the airplane fuselage. Thus the duct which is provided for the intake of air takes in atmosphere at a relative velocity approaching the speed of sound.

In view of the fact that airplanes are now constructed to travel below and above the speed of sound it is necessary in such an accessory drive that the drive mechanism be capable of operation throughout both the subsonic and supersonic range and it is therefore of course desirable that it operate efficiently in both ranges. By the present apparatus applicants have provided a drive system which will operate from a subsonic velocity or from a supersonic velocity without the presence of undesirable shock fronts or other similar disturbances usually found in equipment designed for supersonic operation and using blading for control of the fluid flow.

The turbine of the present invention provides a housing which will hereinafter be termed a "vaneless nozzle." Air which is introduced at the inlet is, through the construction of the present invention, directed inwardly at the proper angle against the turbine blades without the use of blades of any form and at the same time is passed through the speed of sound without serious loss of efficiency.

It is therefore an object of the present invention to provide a turbine capable of operation efficiently at both sub and supersonic fluid inlet speeds.

Still another object of the present invention is to provide a turbine utilizing a vaneless nozzle.

Yet another object of the present invention is to provide an accessory drive turbine in which inlet air traveling below the speed of sound produces a peripheral velocity at the turbine impeller above the speed of sound without a drop in efficiency due to shock configurations or flow separations.

Yet another object of the present invention is to provide a simple supersonic turbine using a minimum of blading and hence requiring a minimum of expense.

A feature of the present invention is the complete elimination of all flow directing blading in the turbine nozzle.

Another important feature of the present invention is the provision of a turbine inlet control capable of reducing the quantity of inlet fluid with a minimum of undesirable throttling action.

Another object of the present invention is to provide an apparatus for the efficient transformation of inlet velocities below the speed of sound into turbine fluid velocities above the speed of sound.

Still other and further objects of the present invention will at once become apparent to those skilled in the art from a consideration of the following attached drawings and following description relating thereto.

Figure 1:
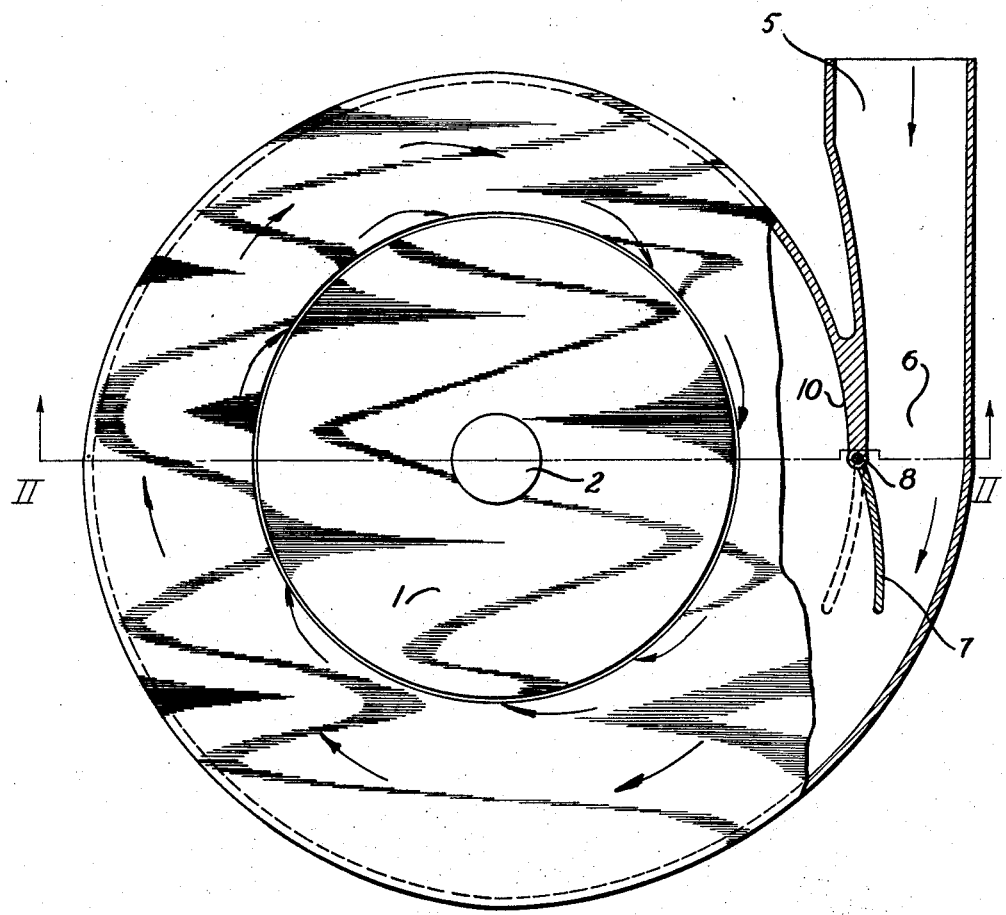
Figure 1 is a side elevational view of a turbine constructed according to the present invention.
Figure 2:
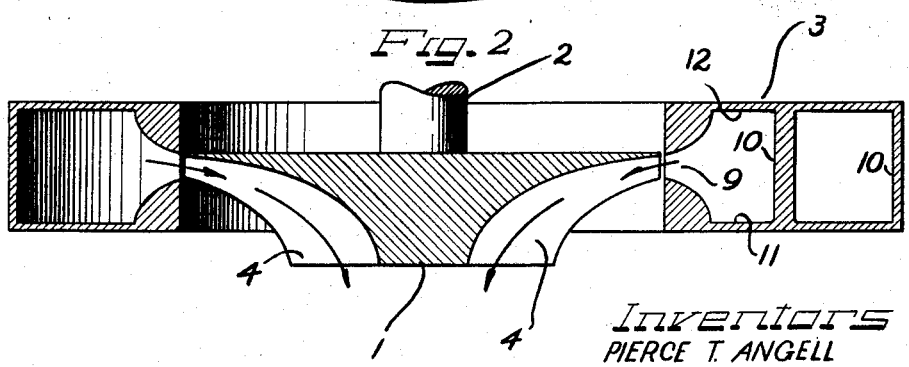
Figure 2 is a cross sectional view taken along the line II—II of Figure 1.

As is seen from Figures 1 and 2 a turbine wheel 1 is supported for rotation upon the shaft 2 within the vaneless nozzle 3. The blades 4 on the turbine wheel 1 are, in the present instance, shown as being radially directed and are shaped as shown in Figure 2 to discharge air moving radially inwardly, along the axis of said shaft 2. The outer nozzle 3 is provided with an inlet 5 which supplies working fluid tangentially of the housing. The outer periphery of the housing takes the form of the logarithmic spiral and is shown in the drawings as providing a volute reducing in diameter in one revolution approximately equal to the diameter of the inlet 5.

At the throat 6 of the inlet 5, a vane 7 is pivotally mounted on a rotating element 8. The vane 7 is of sufficient length to completely close off the throat of the inlet 6 when pivoted counterclockwise about the pivot element 8 and is capable of providing unrestricted flow when in its furthermost clockwise position indicated in the dotted lines of Figure 1. Any conventional linkage may be used to adjust pivot 8 to vary the position of vane 7.

Consideration of the operational theory of the above described turbine shows that compressible fluid entering in the direction of the arrow at the inlet 5 will pass circumferentially clockwise around the turbine housing 1 and also simultaneously will move radially inwardly toward the center of the housing into contact with the turbine wheel 1. The radially inward movement is caused by the shape of the housing 3 in a spiral of constantly decreasing radius with a discharge at the center.

The effect of the decreasing radius is to increase the actual velocity of the particles of fluid as the particles approach the turbine wheel blades 4. This will be realized when it is understood that according to laws of physics, the angular momentum of a particle will remain constant and also that flow radially inwardly toward an aperture (which flow is termed "sink" in the fields of aero and fluid dynamics) bears the relationship $V_r r = K$ or in other words that the velocity of movement toward the central aperture increases inversely as the radius.

Since angular momentum remains constant, exclusive of frictional forces, it may be stated that $I\omega = K$ where I is the moment of inertial of the rotating mass and $\omega$ equals its angular velocity or velocity of rotation. I, the moment of inertia of an object may be stated as $I = \Sigma_m r^2$ which is the summation of the particles of mass of the object times their distances from the center of rotation. Since $r\omega$ equals the linear tangential velocity ($V_s$) it is clear that $V_s r$ is also equal to a constant. This results in a situation in which as each particle of the gas moves inwardly its radial velocity is increased as the radius is decreased under the laws of sink and at the same time its tangential velocity is increased proportionately as the radius is decreased.

Figure 6:
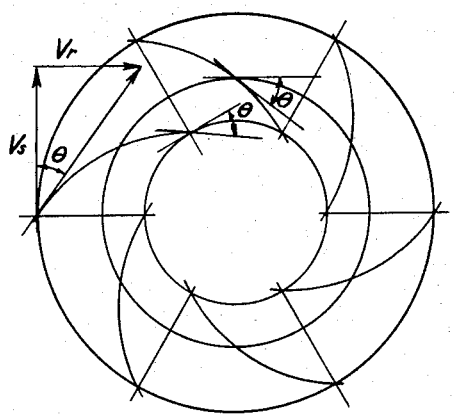
Figure 6 is a vector diagram showing fluid flow relationships.

These two factors combine to provide a vortex flow shown in Figure 6 in which each individual particle moving around the center at an ever decreasing radius has a constantly increasing velocity. This velocity has been found to be substantially the vectorial sum of the tangential velocity ($V_s$) and the radial velocity ($V_r$) and it has been noted that where the side walls of the housing 3 are parallel from the outer periphery to the inner periphery that this resultant velocity will act at a constant angle to a radius line drawn through the center of the housing and the particle, throughout its travel.

This angle is the effective angle of travel of the particle and is the angle at which the particle necessarily will strike the turbine blades 4 as it moves from the housing into the turbine wheel 1. For this reason this angle will hereinafter be termed the nozzle angle $\theta$ and it may be seen that $$\tan \theta = \frac{V_r}{V_s}$$

A consideration of the relationships above discussed clearly indicates that no control over the quantity $V_s$ may be exercised without introducing sufficient friction to absorb a large amount of energy, thereby changing the relationship $V_s r$ equals a constant. Since it is extremely undesirable to introduce friction or other similar energy absorbing elements into the system some other manner of controlling the nozzle angle must be devised.

In the present instance this has been accomplished by varying the radial velocity component $V_r$. This may be accomplished by requiring the gas or fluid to pass through radially constricting walls toward the nozzle outlet or sink. By constricting the outlet at 9 to a value substantially less than the linear measurement of the axial wall 10 of the housing 3, the velocity $V_r$ will increase at a greater rate as it approaches the center of the housing than as if parallel walls were provided. The relationship between the restriction and the increase in the quantity $V_r$ depends, of course, on the configuration of the restricted outlet but it has been found that a restriction of the inner peripheral outlet 9 to a dimension approximately one fourth that of the outer peripheral wall 10 will increase the velocity $$\frac{V_r}{V_s}$$

at the point of the inner peripheral discharge outlet 9 to approximately four times its value if the side walls 11 and 12 had remained parallel throughout.

In this manner it is possible to vary the effective nozzle angle $\theta$ without serious loss of energy. As the gas particles move around the periphery they gradually begin to move inwardly under the influence of the spiral casing toward the outlet 9 at the inner periphery and as they move toward the inner periphery at a rate greater than the change in radius their radial velocity increases due to the constriction. Therefore the factor $$\frac{V_r}{V_s}$$

and with it the nozzle angle $\theta$, increases as the particles move toward the inner periphery.

It has been found through experience that an effective nozzle angle of approximately 16° proves very satisfactory in the ordinary vaned type of turbine in which the gases are directed at the turbine blades by means of guide vanes set in the casing at an angle which will control the flow to the desired extent. This effective nozzle angle has been achieved without the use of vanes in providing appropriate control of the degree of divergence of the turbine casing walls. Thus applicants have managed to retain complete control of the flow of the motive fluid without the need for flow controlling vanes.

This elimination of the vanes as discussed above has permitted the efficient use of applicants' turbine with motive fluids entering the turbine system at slightly below supersonic velocities and in which it is desired to provide a supersonic peripheral velocity at the turbine wheel. In view of the absence of vaning or other mechanical elements in the turbine housing, turbulence and shock configurations have been reduced to an absolute minimum thereby increasing the overall efficiency of the system.

It is of course to be understood that the scope of the present invention comprehends the changing of the degree of convergence or divergence of the turbine housing walls to vary the effective nozzle angle through control of the velocity of sink, $V_r$. It will be apparent from a consideration of the above discussion that the effective nozzle angle in the vaneless turbine herein proposed for use with supersonic fluid will be variable according to only the divergence of the casing walls in a frictionless system. Due to frictional forces involved in actual turbine systems, there will in actuality, be a slight loss of energy in the tangential direction which will cause a decrease in the effective $V_s$. There will of course also be a slight friction loss in the component $V_r$. Since the fluid actually travels over a far shorter radial path than it does in a circumferential path, the friction losses relative to the factor $V_r$ are substantially less than those effecting $V_s$. Therefore the friction losses, generally termed skin friction, will have a net affect of increasing the effective nozzle angle $\theta$ slightly.

In actual practice skin friction values may readily be computed and hence their affect on modification of the values of $V_s$ and $V_r$ may be accurately determined. After their determination, the divergence of the turbine casing walls may be modified to take them into consideration. Having once determined the desired nozzle angle and the convergence of the casing walls, these factors will remain constant for any values of the inlet velocity and will not be affected by passage of the motive fluid from a subsonic velocity to a supersonic velocity within the turbine.

Control of the power output of the turbine may be had by varying the quantity of inlet motive fluid. Several means may be utilized for this, one of which is, of course, the commonly known method of reducing the quantity of fluid by a simple line throttle. However, such a simple line throttling process is undesirable since it introduces a loss of energy resulting from the uncontrolled expansion of the motive fluid leaving the line constriction. This expansion permits the reduced portion of the motive fluid passing through the restriction to expand freely to the volume of the inlet conduit on the downstream side of the constriction. In this expansion, no work is performed and hence the throttling action provides a loss of a substantial amount of energy.

By the present invention, applicants have provided a method of controlling the inlet flow to the supersonic, vaneless nozzle which will approximate the optimum thermodynamic reduction of power obtained in a variable area nozzle. This is accomplished by means of the control vane 7 positioned as indicated at 8 in the turbine housing. This vane 7 does not act as a simple line constriction or throttle in the usual sense since the motive fluid stream passing the vane 7 is not permitted to expand to the volume of the inlet conduit.

Prevention of uncontrolled expansion of the motive fluid leaving the vane 7 is accomplished by the fact that the motive fluid in passing around the turbine housing and progressively moving radially inwardly, has a tendency to flow past the vane 7 on the radial inward side thereof on its second turn around the turbine housing. The presence of the motive fluid immediately behind the vane 7 prevents the incoming motive fluid from uncontrolled expansion into that space, thereby restricting the expansion or throttling action of the incoming fluid and preventing an unnecessary pressure decrease. This positioning of the control vane has provided a substantial improvement over the use of a line restriction and at the same time has aided in diminishing turbulence ordinarily caused by a constriction immediately preceding entry into the turbine.

Figure 3:
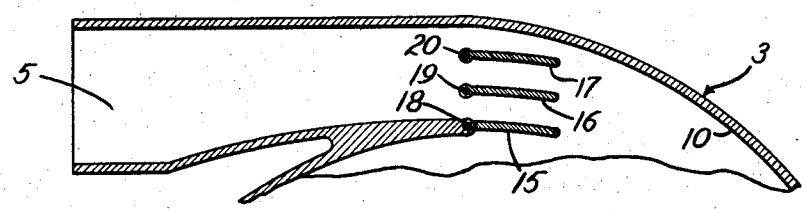
Figure 3 is a side elevational view in partial cross section showing a modified form of a turbine constructed according to the present invention.

Figure 3 shows a modified form of the inlet vaning which will also provide a streamlined inlet flow condition. In that figure a plurality of vanes 15, 16 and 17 have been shown as being pivoted at 18, 19 and 20 and extending generally longitudinally of the flow inlet. By controlling the relative positioning of the vanes 15, 16 and 17, the direction of flow emanating from the end of the vanes may be controlled. Thus the radially outward component caused by a single vane such as 7 can be substantially reduced by sequentially closing vanes 15, 16 and 17 from the radially inward position toward the outside. Thus the vane 15 could be completely closed against the vane 16 requiring all of the flow to be between the outer wall of the casing and the blades 16 and 17. This construction aids in the prevention of turbulence and permits a more streamlined flow of the motive fluid aiding its merger with the second lap of fluid stream at or adjacent to the downstream side of the inlet vanes.

Figure 4:
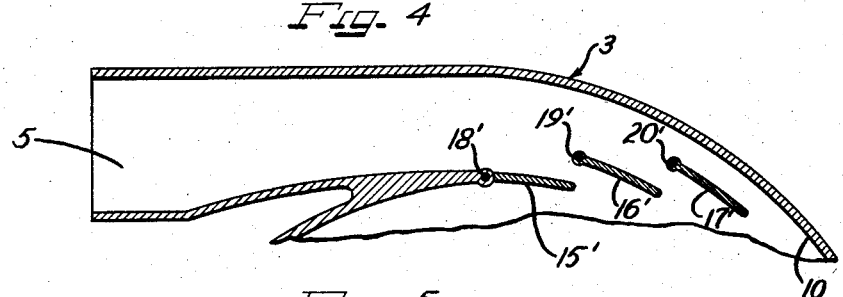
Figure 4 is another modified form of the invention.

A further modification of the inlet vane structure may be found in Figure 4. In this arrangement, the vanes 15', 16' and 17' also extend generally longitudinally of the flow inlet but their points of pivoting, namely 18', 19' and 20' are moved slightly peripherally downstream from one another. As in the case of the modification shown in the solid lines of Figure 3, the vanes 15', 16' and 17' are closed sequentially in that order. This permits a gradual reduction of the air stream around the periphery of the turbine to a greater extent than is permitted when a single flat vane is utilized and hence permits a more gradual merger of the reduced motive fluid stream with the fluid moving about on the second lap immediately radially inward of the vanes.

Figure 5:
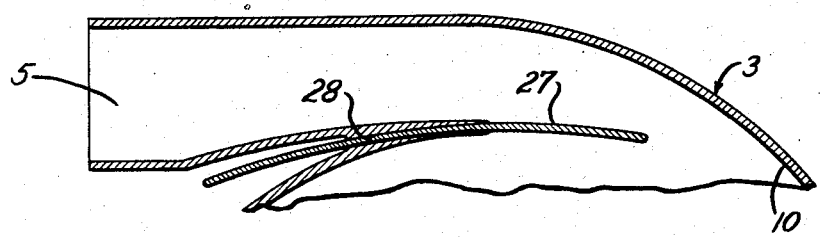
Figure 5 is still a further modified form of the invention.

Figure 5 shows a vaneless nozzle constructed according to the present invention and in which a sliding valve plate is used. Due to the slightly different arcs used in the outer wall of the casing 3 and the valve plate 27, the valve plate will, when inserted into the slot 28, cause a gradual restriction of the inlet 5. This restriction is quite smooth and provides smooth flow on the under side of the plate thereby aiding in preventing turbulence when the fluid returns past the plate on the second lap of travel.

It is to be noted that all of the above modifications of the inlet vane structure provide a substantial increase in efficiency over a pure line constriction above discussed since the re-expansion of the fluid passing through the constriction caused by the vanes is limited to substantially less than that permitted by the simple restriction by the presence of the moving fluid in the second lap of travel.

In view of the substantially direct relationship between radius and relative velocity of the inlet fluid, it is apparent that the present turbine may be constructed to provide different turbine speeds from a specified inlet velocity by a modification of the radius ratio. By this is meant the ratio of the radius of the inlet flow relative to the radius of the inner periphery or outlet of the nozzle, or the outer periphery of the turbine element. Since the velocity of the motive fluid increases as the radius decreases a greater increase in velocity from an initial fluid velocity may be achieved through a change in turbine construction which either reduces the diameter of the turbine element or increases the outside diameter of the housing or inlet radius.

In this connection it is noted that it has been found that where the inlet radius bears an effective value of 1.5 and the radius of the turbine element a value of .75 an increase in tangential velocity from an inlet velocity $V_s$ of Mach .65 to a velocity $V_s$ at the turbine periphery of substantially Mach 1.5 is achieved (tangential velocity). It will thus be seen that through the provision of the instant turbine utilizing a vaneless housing to perform the function of an efficient nozzle, applicants have been able to operate at turbine peripheral velocities greater than the speed of sound without the usual losses resulting from shocks and turbulence generally associated with the passage of air through the speed of sound. By the use of the substantially non-throttling inlet vane in combination with, a vaneless turbine nozzle, the subsonic or supersonic velocities at the inlet of the turbine are changed to supersonic velocities with substantial streamline flow. Applicants have thus been able to provide an extremely efficient turbine adapted to provide supersonic turbine wheel velocities in a simple manner and by utilizing an extremely rugged structure requiring an absolute minimum of relatively fragile elements such as vanes.

It is to be understood that modifications and variations may be constructed according to the present invention without departing from the concepts of the present invention.

We claim as our invention:

1. A turbine having a wheel for operation at peripheral velocities above the speed of sound comprising a vaneless nozzle completely encircling said wheel and having a vaneless inner peripheral outlet facing said wheel and extending 360° around the periphery of said wheel, said nozzle having radially extending side walls and an outer peripheral wall progressively closer to the periphery of said wheel in the general form of a logarithmic spiral, said nozzle having a tangential inlet in its outer peripheral wall introducing fluid tangentially thereof, the radial dimension of said side walls being at least as great as the radial dimension of the inlet for at least 360° from the inlet, said nozzle having its side walls converging toward the inner peripheral outlet at a rate constant throughout the periphery of the inner peripheral outlet, and means introducing fluid at said inlet at a velocity at or slightly below the velocity of sound.

2. A supersonic vaneless nozzle constructed in the form of a logarithmic spiral, said nozzle having a tangential inlet at its outer periphery and a vaneless radially inwardly directed outlet at its inner periphery, said nozzle having radially extending side walls the radial dimensions of which are at least as great as the radial dimension of the inlet for at least 360° of fluid turn from the inlet, and the side walls of said nozzle being convergent toward the inner periphery at a rate constant throughout the circumference of the inner periphery, whereby the effective nozzle angle at the inner periphery is greater than at the inlet and is constant throughout the circumference of the inner periphery, and inlet control means for reducing the quantity of inlet fluid comprising a control vane mounted adjacent said inlet at a point on the nozzle radially inwardly of the inlet and movable toward the outer periphery of the nozzle to reduce the area of the inlet while maintaining the flow of inlet fluid adjacent the outer periphery of the nozzle.

References Cited in the file of this patent

UNITED STATES PATENTS

| | | |
|---|---|---|
| 1,386,548 | Blackmon | Aug. 2, 1921 |
| 1,445,310 | Hall | Feb. 13, 1923 |
| 1,548,341 | Banki | Aug. 4, 1925 |
| 2,613,609 | Buchi | Oct. 14, 1952 |
| 2,652,191 | Buchi | Sept. 15, 1953 |
| 2,715,814 | Barr | Aug. 23, 1955 |

FOREIGN PATENTS

| | | |
|---|---|---|
| 168,357 | Austria | May 25, 1951 |
| 340,179 | Germany | Sept. 5, 1921 |
| 438,590 | Germany | Dec. 21, 1926 |
| 474,916 | Canada | July 3, 1951 |